UNITED STATES PATENT OFFICE.

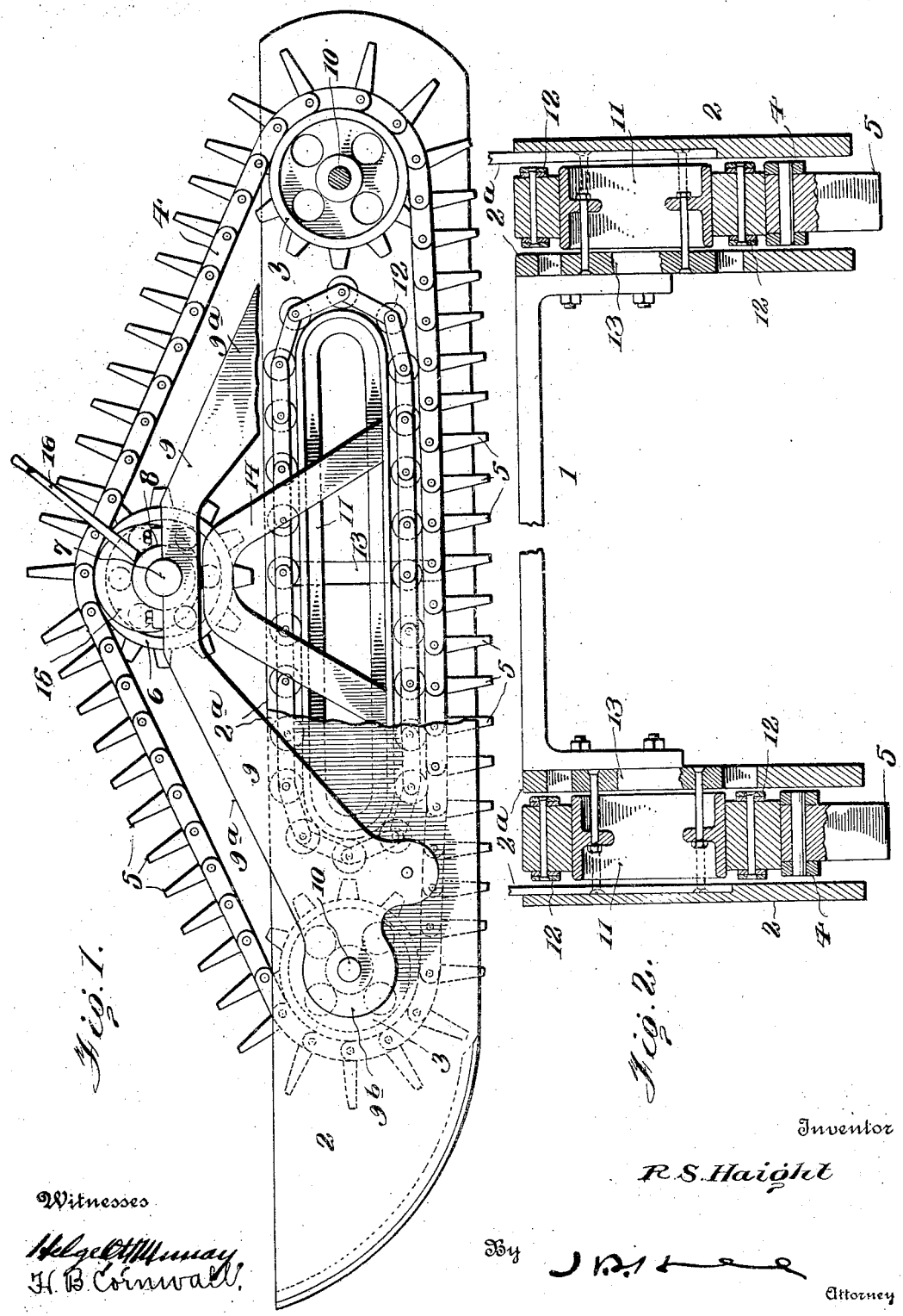

ROY S. HAIGHT, OF VIKING, ALBERTA, CANADA.

RUNNER FOR MOTOR-SLEIGHS.

1,044,646.

Specification of Letters Patent. Patented Nov. 19, 1912.

Application filed January 3, 1912. Serial No. 669,186.

*To all whom it may concern:*

Be it known that I, ROY S. HAIGHT, a subject of the King of England, residing at Viking, in the Province of Alberta, Dominion of Canada, have invented certain new and useful Improvements in Runners for Motor-Sleighs, of which the following is a specification.

The present invention relates in general to sled propelling means, and more particularly to an improved runner for motor sleighs which embodies novel features of construction whereby the sled can be propelled in a positive and reliable manner, and whereby the tractive power of the runner can be increased or decreased as may be required by the conditions of the road surface.

One of the objects of the invention is to provide a motor sled which is comparatively simple and inexpensive in its construction, which comprises few and durable parts such as are not liable to get out of repair, and which will operate with the expenditure of a minimum amount of power.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:

Figure 1 is a side elevation of a motor sled constructed in accordance with the invention, portions being broken away to more clearly illustrate the construction of the runner, and Fig. 2 is a transverse sectional view through the sled, portions being broken away.

Corresponding and like parts are referred to in the following description and indicated in all the views of the drawings by the same reference characters.

Referring to the drawing, the numeral 1 designates the sled platform which is supported by means of a series of runners 2, one of the said runners being shown in the present instance as located at each side of the platform, although the exact arrangement of these runners is quite immaterial so far as the essential features of the invention are concerned. Each of the runners 2 is formed with a pair of spaced side pieces 2ª which are rigidly connected, guide or sprocket wheels 3 being suitably journaled between the sides 2ª at points toward the opposite ends thereof. An endless belt or chain 4 passes around the sprocket wheels 3 and is provided with a series of traction teeth 5 adapted to project below the runner so as to bite into the surface of the road. The upper reach of the chain 4 passes over a third sprocket wheel 6 which is rigid with a shaft 7, the ends of the shaft being journaled in suitable bearings 8 upon side frames 9. Power may be applied to the shaft 7 from any suitable source, the sprocket wheel 6 turning with the shaft so as to transmit motion to the chain 4 and propel the sled when the said shaft turns. Each of the side frames 9 comprises a pair of downwardly diverging arms 9ª which are secured to opposite ends of the respective runners 2, the lower ends of the said arms being formed with bearing plates 9ᵇ receiving the shafts 10 upon which the guide or sprocket wheels 3 are mounted.

The invention further contemplates the provision of means whereby the lower reach of the endless chain 4 between the guide wheels 3 can be moved up and down to regulate the distance the traction teeth 5 project below the runner, thereby enabling the tractive power of the runner to be readily adjusted for either a hard icy surface or a soft and slushy road. A guide block 11 is movably mounted between the sides 2ª of the runner at a point over the lower reach of the endless belt 4, the said block being shown as having an elongated formation and provided with curved ends. This block may be very readily formed, as indicated upon the drawing, by suitably bending a piece of T-iron so as to provide an endless runway. A chain of rollers 12 extend around the exterior of the guide block 11 and are interposed between the said guide block and the endless chain 4 so as to reduce the friction and prevent any possible binding of the said chain 4 in the operation of the device. The chain of rollers 12 moves with the drive or traction chain 4, and the block 11 can be moved up and down within the runner so as to cause the traction teeth 5 to project a greater or less distance below the runner as may be required.

Any suitable means may be provided for holding the block 11 against lateral displacement, and in the present instance it is shown as connected to a vertically moving slide 13 suitably mounted within one of the sides 2ª of the runner. A frame 14 projects upwardly from the block 11 and is provided at the top thereof with a suitable bearing surface adapted to be engaged by a cam 15 loose upon the drive shaft 7. Any suitable means such as a lever 16 may be provided for turning the cam 15, and it will be obvious that through the medium of this cam the block 11 can either be forced downwardly to cause the traction teeth 5 to project a greater distance below the runner 2, or permitted to rise so that the traction teeth will project a less distance below the runner. In this manner the projection of the traction teeth below the runner can be very readily regulated and the sled thereby quickly adjusted so as to operate in the most economical manner upon all kinds of road surfaces.

Having thus described the invention, what I claim as new and desire to secure by Letters Patent, is:

1. In a device of the character described, the combination of a runner including spaced sides, a pair of guide wheels journaled between the spaced sides of the runner at points toward the ends thereof, a frame projecting upwardly from the runner, a shaft journaled upon the frame, a guide wheel upon the shaft, a drive chain passing around the guide wheels and the said drive wheel, traction teeth projecting from the drive chain, the said traction teeth upon the lower reach of the drive chain extending below the runner, a block mounted between the sides of the runner and arranged over the lower reach of the drive chain, a cam upon the before mentioned shaft, and means actuated by the cam for moving the block to regulate the projection of the traction teeth below the runner.

2. In a device of the character described, the combination of a runner, guide wheels journaled upon the runner, a frame projecting from the runner, a shaft journaled upon the frame, a drive wheel upon the shaft, a drive chain extending around the guide wheels and the said drive wheel, traction teeth projecting from the drive chain, the said traction teeth upon the lower reach of the drive chain extending below the runner, a block adjustably mounted upon the runner at a point over the lower reach of the drive chain, a chain of rollers extending around the block and interposed between the same and the drive chain, a frame projecting from the block, and a cam loose upon the before mentioned shaft, the said cam engaging the frame of the block for moving the block to regulate the projection of the traction teeth below the runner.

In testimony whereof I affix my signature in presence of two witnesses.

ROY S. HAIGHT.

Witnesses:
 J. W. MARTIN,
 G. SUMMY.